United States Patent
Cattafesta, III et al.

[11] Patent Number: 6,078,674
[45] Date of Patent: Jun. 20, 2000

[54] MASS INJECTION FOR REDUCING FLOW-INDUCED RESONANCE IN A CAVITY

[75] Inventors: Louis N. Cattafesta, III; Richard W. Wlezien, both of Yorktown, Va.; Chin C. Won, Los Altos, Calif.; Sanjay Garg, Williamsburg; Deepak Shukla, Hampton, both of Va.

[73] Assignee: High Technology Corporation, Hampton, Va.

[21] Appl. No.: 09/095,228

[22] Filed: Jun. 10, 1998

[51] Int. Cl.$^7$ ........................................ A61F 11/06
[52] U.S. Cl. .......................... 381/71.7; 244/1 N; 244/130
[58] Field of Search .................... 381/71.1, 71.2, 381/71.5, 71.7, 71.8, 71.14, 94.1; 181/206; 244/130, 204, 1 N

[56] References Cited

U.S. PATENT DOCUMENTS 5,699,981  12/1997  McGrath et al. ................ 244/1 N
5,818,947  10/1998  Cattafesta, III et al. .............. 381/71.7

*Primary Examiner*—Vivian Chang
*Attorney, Agent, or Firm*—Peter J. Van Bergen

[57] ABSTRACT

A method and system are provided for reducing flow-induced resonance in a cavity of a structure. At least one pair of diaphragms are mounted in a housing and separated from one another such that a chamber is formed therebetween within the housing. A first diaphragm of the pair of diaphragms is oscillated in accordance with a time-varying function. A second diaphragm of the pair of diaphragms is oscillated inversely to the first diaphragm so that pressure in the chamber formed therebetween changes in correspondence with the time-varying function. The chamber is vented at a position flush with the surface of the structure along the leading edge of the cavity. As a result of such venting, the pressure in the chamber that changes in correspondence with the time-varying function introduces a corresponding time-varying disturbance into the shear layer along the leading edge of the cavity. The time-varying disturbance reduces the energy that is available in the shear layer that can interact adversely with the cavity to generate resonance.

17 Claims, 4 Drawing Sheets

MASS INJECTION FOR REDUCING FLOW-INDUCED RESONANCE IN A CAVITY

CROSS-REFERENCE TO RELATED PATENT APPLICATIONS

This patent application is co-pending with related patent applications entitled "REDUCING FLOW-INDUCED RESONANCE IN A CAVITY", Ser. No. 08/751,179, filed Nov. 15, 1996, and "MASS INJECTION FOR FLOW MODIFICATION", filed on the same date as this patent application, and owned by the same assignee as this patent application.

FIELD OF THE INVENTION

The invention relates generally to flow-induced cavity resonance, and more particularly to a method and system for reducing resonance in a structure's cavity caused by a flow passing over the surface of the structure and the cavity.

BACKGROUND OF THE INVENTION

The control of the resonant interaction between a free shear layer and a cavity is of direct relevance to many wind-tunnel testing and aircraft applications. Acoustic levels in zones of local flow separation such as gaps, cavities, and junctures can generate pure tone acoustic components having large amplitudes which, at a minimum, contaminate acoustic field measurements and which, in the extreme, lead to fatigue of components and systems. Such cavities exist in landing gear bays, weapon delivery systems, optics bays, at junctions between wind tunnel model components, and in a variety of instrument installation configurations. Cavity noise is a major reliability and maintainability issue in several aircraft programs, and can be a dominant factor in determining the success of programs with instrumentation in cavities. Thus, the control of internal cavity dynamic loads is an issue of critical importance.

The complex nature of cavity flows begins when a thick (usually turbulent) boundary layer separates at the upstream or leading edge of a cavity formed in a portion of a structure. Local conditions such as the shape of the leading edge control the actual separation location. A leading edge that is sharp fixes the separation location but also enhances shear-layer receptivity to acoustic disturbances. The unsteady characteristics of the resulting free shear layer over the cavity are determined by the mean profile and turbulence characteristics of the incoming boundary layer as well as the disturbances imposed on the shear layer through the receptivity process. The shear layer over the cavity develops based on the separating shear layer conditions and the instability characteristics of the mean shear layer profile. Velocity profile shaping can be used with some success to move the amplification band away from those frequencies tuned to cavity resonance.

The leading edge of the cavity is the significant location for acoustic receptivity which is defined as the process by which long-wavelength acoustic disturbances couple with the shorter-wavelength disturbances in the separating free shear layer. When a leading edge is sharp, the shear layer is highly susceptible to the unsteady pressure gradients imposed by the interaction between the incident acoustic field and the leading edge. If the leading edge is blunt, it produces significantly lower receptivity to externally imposed acoustic fields.

The shear layer subsequently reattaches to the surface of the structure at the aft end or trailing edge of the cavity which serves as the primary acoustic source. In cases where reattachment is delayed until past the trailing edge, the reattachment is more benign and the acoustic levels are reduced in amplitude. Rounded or perforated trailing edges have been used to modify the reattachment zone and decrease the amplitude of the acoustic disturbance field.

The sound produced when the shear layer reattaches to the aft cavity wall provides the primary acoustic source that drives the cavity acoustics. The geometric shape of the cavity determines which specific acoustic modes dominate. For example, a cavity having regular internal dimensions will produce the greatest resonant amplitudes. Since the shear layer provides a wide range of source frequencies, there exists the possibility that natural cavity resonances will be stimulated. Irregular cavity dimensions will reduce the peak acoustic amplitudes, but in turn will ensure that resonance conditions exist over a wide range of frequencies and operating conditions. Thus, passive geometric modifications to the cavity or its surrounding environment will not necessarily lead to a solution of the resonance problem over a wide range of frequencies and operating conditions.

Another source of resonance in the cavity is the feedback of energy to the leading edge where the initial separation occurs. The amplitude and frequency content of the feedback ultimately controls the shear layer disturbance. Some reduction of feedback can be achieved through the use of sound-absorbing cavity liners. However, while reducing resonance amplitude and generation of tones, such liners are typically not effective at low acoustic frequencies because the thickness of the liners becomes large compared to the cavity dimensions. Therefore, additional noise reduction mechanisms are generally used in conjunction with such liners.

Acoustic amplitude reduction can also be achieved by introducing cancellation noise from one or more acoustic sources. This approach has successfully been employed in the prior art for reduction of low-frequency components of noise emitted from exhaust systems, for ambient noise reduction in headsets, and for localized noise reduction in aircraft interiors. When the acoustic sources are configured with the appropriate phase, amplitude, and frequency content, acoustic levels can be minimized within certain constraints. For example, in duct propagation where plane waves are the dominant component, the plane waves can effectively be canceled with a limited number of sources. However, in more complex three-dimensional environments such as cavities, it is only possible to minimize the noise at a limited number of locations. In essence, the number of active sources controls the number of degrees of freedom available for active cancellation. Thus, active cancellation is not a practical option for lowering acoustic levels within an entire cavity. In addition, the large sound levels encountered in the cavity require impractical power inputs for effective sound cancellation.

SUMMARY OF THE INVENTION

Accordingly, it is an object of the present invention to provide a method and system for reducing flow-induced resonance in a cavity.

Another object of the present invention is to provide a method and system for reducing flow-induced resonance in a cavity over a range of flow conditions.

Still another object of the present invention to provide a method and system that dynamically adjusts to changing flow conditions in order to reduce flow-induced resonance in a cavity.

Other objects and advantages of the present invention will become more obvious hereinafter in the specification and drawings.

In accordance with the present invention, a method and system are provided for reducing flow-induced resonance in a cavity of a structure. A flow moves over the structure and past the cavity such that a leading edge and a trailing edge of the cavity are defined with respect to the direction of the flow. The flow attaches to the surface prior to the leading edge and separates from the surface at the leading edge to generate a shear layer originating at the leading edge. At least one pair of diaphragms are mounted in a housing and separated from one another such that a chamber is formed therebetween within the housing. A first diaphragm of the pair of diaphragms is oscillated in accordance with a time-varying function. A second diaphragm of the pair of diaphragms is oscillated inversely to the first diaphragm so that pressure in the chamber formed therebetween changes in correspondence with the time-varying function. The chamber is vented at a position flush with the surface of the structure along the leading edge of the cavity. As a result of such venting, the pressure in the chamber that changes in correspondence with the time-varying function introduces a corresponding time-varying disturbance into the shear layer along the leading edge of the cavity. This reduces the energy that is available in the shear layer that can interact with the cavity to generate resonance at one or more resonant frequencies of the cavity.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
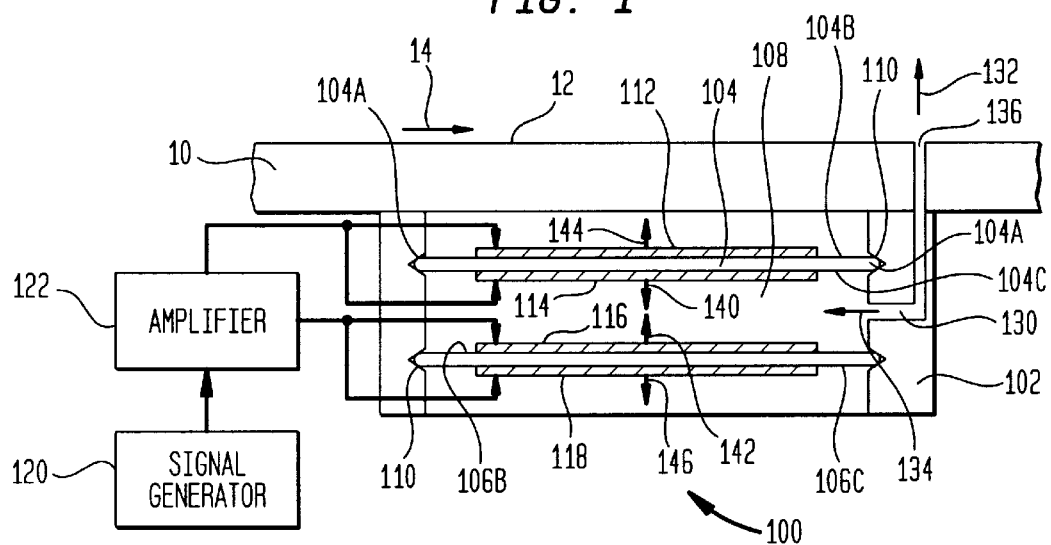
FIG. 1 is a schematic side view of a mass injection system used in the present invention and configured for alternating blowing and suction action.

Referring now to the drawings, and more particularly to FIG. 1, a mass injection system constructed for use in the present invention is shown and referenced generally by numeral 100. As will be explained in greater detail below, system 100 is mounted in a structure 10 having a surface 12 over which a fluid flow 14 is moving. For example, if structure 10 is an aircraft, the portion of (air) flow 14 that is of concern is generally the boundary layer.

System 100 includes a housing 102 typically embedded in structure 10 and out of flow 14. Mounted within housing 102 are a pair of flexible diaphragms with one diaphragm referenced by numeral 104 and the other referenced by numeral 106. Diaphragms 104 and 106 can be any elastic material that is flexible enough to provide the necessary deflection. Note that a stiff material may be preferred when system 100 is to operate over a wide bandwidth of operation. By way of illustrative example, it will be assumed that diaphragms 104 and 106 (as well as the diaphragms described later below in alternative embodiments of the present invention) are made from a thin shim or sheet of electrically conductive material such as steel, aluminum, copper, etc. The diaphragms could also be made from a non-electrically conductive material provided the top and bottom surfaces of the piezoelectric material are plated with electrically conductive material as is known in the art. The geometric shape of each diaphragm (in terms of a plan view thereof) is not a limitation of the present invention. That is, each diaphragm can be a thin sheet that is round, square, rectangular, etc.

Diaphragms 104 and 106 are mounted in housing 102 such that an isolated chamber 108 is formed therebetween within housing 102. Accordingly, a variety of mountings are possible. For example, the entire perimeter of each of diaphragms 104 and 106 could be clamped to the side walls of housing 102. Alternatively, just portions of each diaphragms's perimeter could be clamped with the remaining portions forming a viscous seal with the side walls of housing 102. As is known in the art, a "viscous seal" is one where a small gap (e.g., a few mils) exists between "sealing" surfaces to allow vibratory motion therebetween while essentially preventing fluid movement therethrough. Still another alternative is to simply support all or some portion of the perimeter of each diaphragm to allow for a greater range of diaphragm motion. A representative form of a simple support for the diaphragms is depicted in FIG. 1 where at least a portion of the internal periphery of housing 102 has a channel 110 (e.g., a V-channel) formed therein. A corresponding portion of the perimeter of a diaphragm (e.g., perimeter portion 104A of diaphragm 104) is appropriately tapered and fitted into channel 110 but is not fixed to housing 102. Still another option is to provide a combination of clamping, simple supports and/or viscous sealing for each diaphragm.

In the present invention, each diaphragm 104 and 106 must be actuated into bending motion. This can be achieved by providing one or more pieces of piezoelectric material on one or opposing faces of each diaphragm and electrically exciting the piezoelectric material. Thus, the diaphragm and piezoelectric material combine to form a bending element. Suitable piezoelectric materials include piezoceramics such as lead zirconium titanate (PZT). In the illustrated example, piezoelectric sheets 112 and 114 are sandwiched about and bonded to opposing faces 104B and 104C, respectively, of diaphragm 104. Such bonding techniques are well known in the art and will therefore not be described herein. Similarly, piezoelectric sheets 116 and 118 are sandwiched about and bonded to opposing faces 106B and 106C, respectively, of diaphragm 106. A voltage supply in the form of, for example, a signal generator 120 coupled to an amplifier 122 supplies a time-varying (e.g., periodic or non-periodic) drive voltage to piezoelectric sheets 112, 114, 116 and 118, in order to excite diaphragms 104 and 106 into motion. The size, number and/or configuration of the piezoelectric materials is not a limitation of the present invention.

In its simplest embodiment illustrated in FIG. 1, chamber 108 is coupled directly to surface 12 by a pathway 130. In operation, the drive voltage must cause diaphragms 104 and 106 to oscillate inversely, i.e., 180° out-of-phase with each other so that diaphragms 104 and 106 move either towards one another or away from one another in synchromization. Such synchronized movement of diaphragms 104 and 106 can be accomplished in various ways. For example, each bending element (e.g., diaphragm 104 in combination with piezoelectric sheets 112 and 114) can be connected/wired in standard series, parallel or monomorph electrical configurations which are well known in the art. To achieve the necessary inverse synchronous motion, the positive and negative leads can be reversed for the other bending element in the pair (e.g., diaphragm 106 in combination with piezoelectric sheets 116 and 118). Another way of achieving the necessary inverse synchronous motion is to use two separate channels of amplification that are 180° out-of-phase with one another.

Regardless of the bending element configuration used, when diaphragms 104 and 106 deflect towards one another as indicated by arrows 140 and 142, pressure in chamber 108 increases. The increased pressure is vented out through pathway 130 to surface 12 as indicated by arrow 132 when the pressure in chamber 108 exceeds the pressure at surface 12 by an amount equal to the viscous losses in pathway 130. When diaphragms 104 and 106 deflect away from one another as indicated by arrows 144 and 146, pressure in chamber 108 decreases and draws fluid (e.g., air) into chamber 108 through pathway 130 as indicated by arrow 134. The blowing and suction experienced at location 136 (i.e., where pathway 130 vents to surface 12) results in a zero net mass flux and is the source of a time-varying disturbance in flow 14 for flow modification. The frequency and amplitude of the disturbance can be tailored for a specific application. The angle of pathway 130 at location 136 relative to surface 12 (e.g., a 90° angle is illustrated) can also be modified for a particular application.

Piezoelectric materials have a direction of polarization as is known in the art. Further, piezoelectric materials can become permanently depolarized if driven by a voltage in a direction opposite that of the material's direction of polarization. To avoid this problem, the drive voltage supplied by signal generator 120 and amplifier 122 is applied in the material's direction of polarization.

Figure 2:
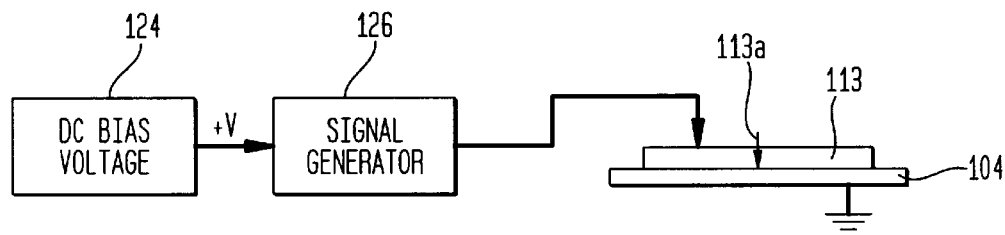
FIG. 2 is an isolated schematic view of one embodiment of a piezoelectric-actuated bending element used in the present invention configured in a way that eliminates the chance of depolarization of the piezoelectric.

Each bending element in the present invention can be implemented in a way that eliminates the chance of piezoelectric depolarization. In FIG. 2, a unipolar excitation scheme is illustrated where diaphragm 104 is an electrically conductive material shown in isolation with piezoelectric 113 bonded to just one surface thereof. An arrow 113A indicates the direction of polarization. A positive DC bias voltage (e.g., +V) is supplied from DC bias voltage supply 124 to the time-varying voltage (e.g., an AC voltage swinging between −V and +V) supplied by signal generator 126. If the DC bias voltage is properly selected, the minimum voltage will never be sufficiently negative to depolarize the piezoelectric. For the illustrated example, the voltage applied to piezoelectric 113 fluctuates from 0 to 2V instead of from −V to +V since a bias voltage of +V is supplied. This eliminates any chance for depolarization of piezoelectric 113 while simultaneously allowing high alternating voltage input amplitudes. High fluctuating voltages result in higher deflections of diaphragm 104/piezoelectric 113. Such enhanced deflection capability is not possible without the unipolar excitation scheme illustrated in FIG. 2.

Figure 3:
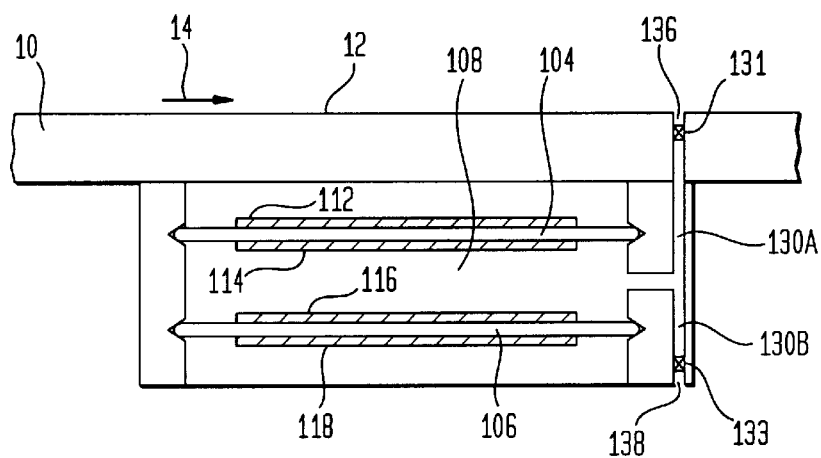
FIG. 3 is a schematic side view of another mass injection system configured for pulsed blowing or pulsed suction.

While a simple mass injection system for use in the present invention has been described in FIG. 1, other mass injection systems can be used. For example, FIG. 3 depicts another suitable mass injection system shown without its drive electronics for clarity of illustration. In FIG. 3, pathway 130 breaks out into two branches 130A and 130B. Branch 130A leads to vent location 136 at surface 12 while branch 130B leads to another vent location 138 that vents to an environment outside of chamber 108. Disposed along branch 130A is a first check valve 131 and disposed along branch 130B is a second check valve 133. Check valves 131 and 133 are one-way valves that can be configured for either blowing or suction at their respective vent location 136 and 138 depending on the application. For example, if blowing is desired at vent location 136, check valve 131 is configured to only permit flow towards surface 12 while check valve 133 is configured to only permit flow towards chamber 108. Note that pathway 130B could be led to another vent location at surface 12 if it is so desired.

Figure 4:
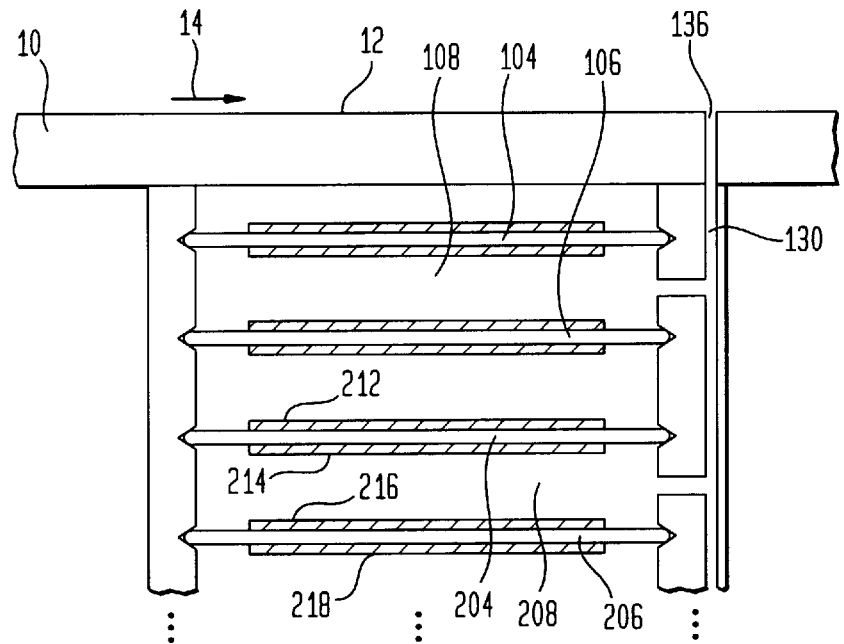
FIG. 4 is a schematic side view of another mass injection system configured with plurality of chambers coupled to a single vent for alternating blowing and suction action.

FIG. 4 depicts still another mass injection system in which multiple pairs of diaphragms are coupled to a single vent location. Once again, drive electronics are omitted for clarity of illustration. As in the single pair embodiments, each additional pair of diaphragms includes diaphragms 204 and 206 with piezoelectric material sheets 212/214 and 216/218, respectively, bonded thereto. The resulting isolated chamber 208 is coupled to pathway 130. Assuming each diaphragm pair is excited in unison, increasing and decreasing pressures developed in each chamber will be synchronized so that a greater (mass flow) disturbance is experienced at vent location 136. Note that the diaphragm pairs could be arranged side-by-side or in columnar fashion as illustrated.

Figure 5:
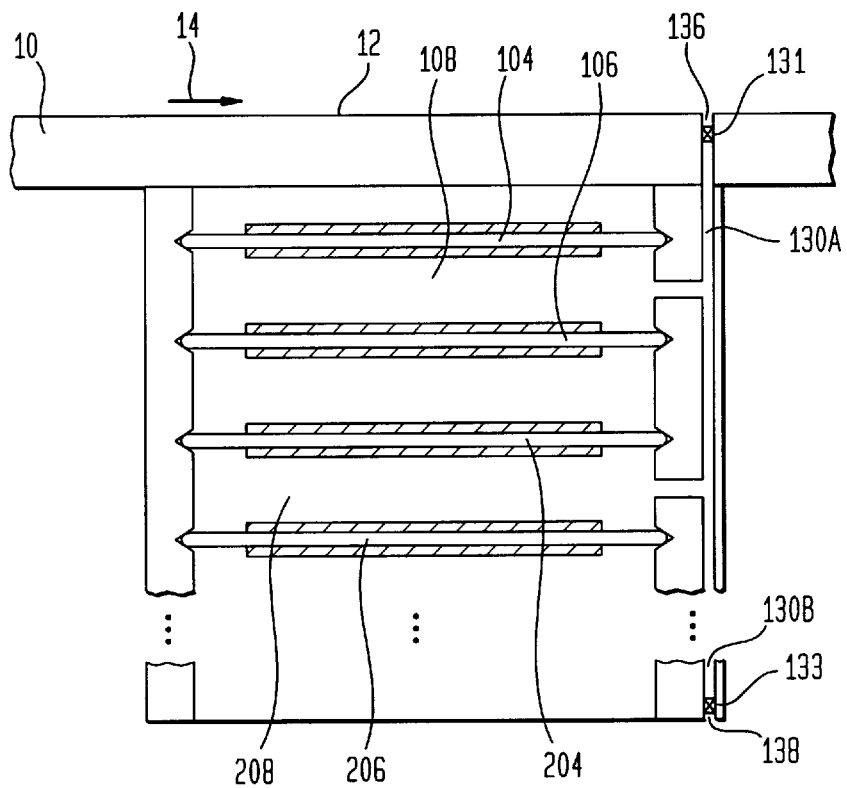
FIG. 5 is a schematic side view of another mass injection system configured with a plurality of chambers coupled to a single valved inlet and a single valved outlet.

FIG. 5 depicts a multiple diaphragm pair arrangement similar to that in FIG. 4 but configured with pathway 130 again breaking into two branches 130A and 130B with check valves 131 and 133 disposed therealong, respectively. As with the embodiment depicted in FIG. 3, check valves 131 and 133 can be selected such that vent location 136 is either a blowing outlet or a suction inlet.

Figure 6:
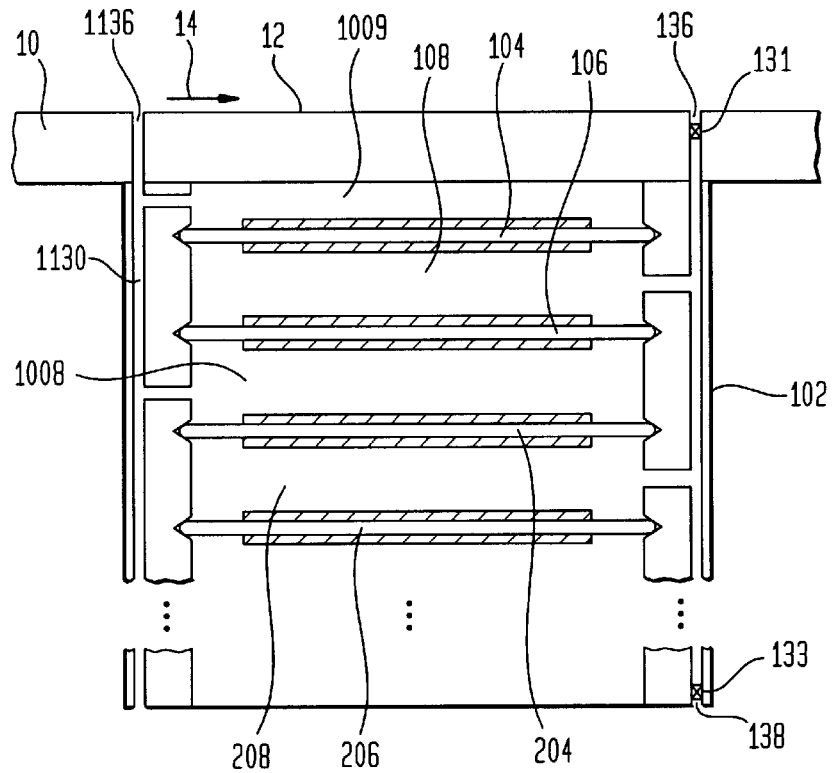
FIG. 6 is a schematic side view of another mass injection system configured with a plurality of primary chambers and a plurality of secondary chambers which can be formed using portions of adjacent primary chambers.

FIG. 6 depicts yet another multiple diaphragm pair arrangement that is configured to take advantage of secondary isolated chambers formed between adjacent pairs of diaphragms when the pairs are arranged in a columnar fashion. Since diaphragms 106 and 204 effectively form a seal with housing 102, one such secondary isolated chamber 1008 is formed therebetween. Note that another secondary chamber can be formed at either end of the stack of diaphragms such as secondary chamber 1009 formed between housing 102 and diaphragm 104. Chambers 1008 and 1009 can be led, for example, directly to surface 12 via pathway 1130 which terminates at vent location 1136. If each diaphragm pair is activated in synchronization as described above, chambers 1008 and 1009 will experience a pressure increase whenever chambers 108 and 208 are experiencing a pressure decrease. Conversely, chambers 1008 and 1009 will experience a pressure decrease whenever chambers 108 and 208 are increasing in pressure. It is to be understood that additional such secondary chambers can be formed and used in a similar fashion.

Figure 7:
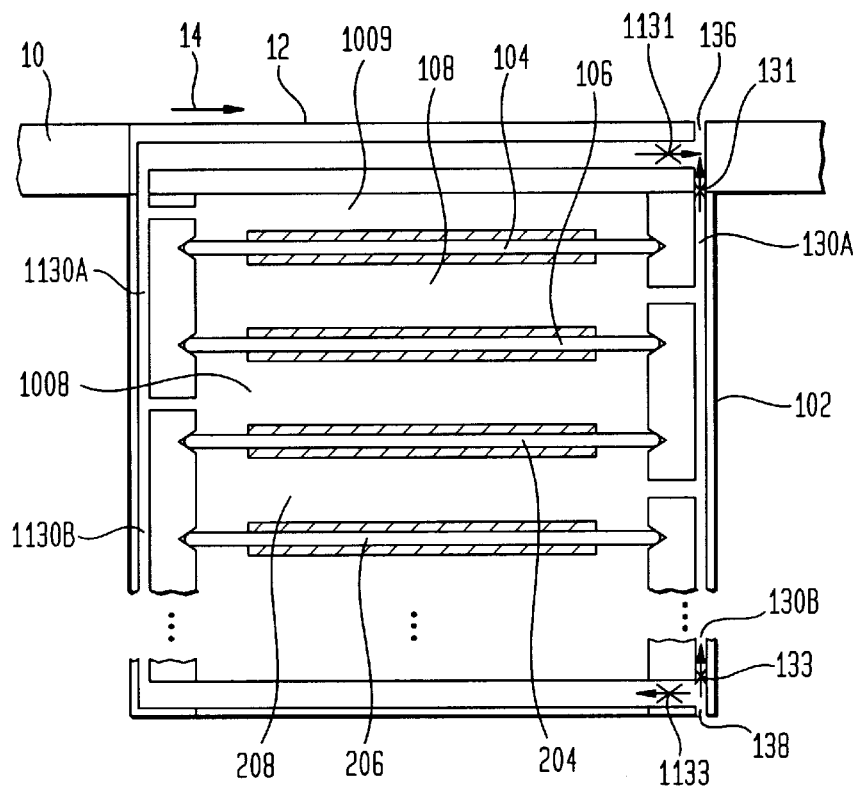
FIG. 7 is a schematic side view of the mass injection system configured with a plurality of primary chambers and a plurality of secondary chambers where plumbing is provided to construct a fluidic rectifier.

The present invention can further be adapted to form a fluidic rectifier as illustrated in FIG. 7. More specifically, secondary chambers 1008 and 1009 are coupled to two pathways 1130A and 1130B with pathway 1130A being coupled to pathway 130A and pathway 1130B being coupled to pathway 130B. One-way check valves 131 and 133 are disposed in pathways 130A and 130B, respectively, and one-way check valves 1131 and 1133 are disposed in pathways 1130A and 1130B, respectively. As indicated by the arrows passing through the check valves, check valves 131 and 1131 only permit an outflow at vent location 136 while check valves 133 and 1133 only permit an inflow at vent location 138. Assuming each diaphragm pair is excited in unison, increasing and decreasing pressures developed in chambers 108 and 208 will be synchronized with one another while the pressure in chamber 1008 changes inversely to the pressure changes in chambers 108 and 208. In this way, a positive flow out of vent location 136 will be generated throughout the entire cycle of actuation thereby producing a rectified output at vent location 136. Note that check valves 133 and 1133 are arranged to allow fluid to be drawn into the appropriate chambers whenever the volume thereof increases.

The advantages of using such a mass injection system in the present invention are numerous. Flow modifications are easily achieved by introducing a periodic or non-periodic time-varying disturbance at the surface over which the flow is moving. The time-varying disturbance can come in the form of pulsed blowing, pulsed suction or oscillating blowing and suction. Since only small vent holes are required at a structure's surface, critical airflow surface shapes need not be altered. Further, since the system utilizes thin diaphragms and piezoelectric materials, the system can be made compactly to fit within a structure near a location of operation. By being able to draw on any surrounding environment for its source fluid (e.g., air), a self-contained flow modification system can be incorporated into the present invention.

It is to be understood that suitable mass injection systems can be implemented in ways other than described above. For example, drive voltages can be generated and applied in a variety of ways as long as the first and second diaphragm of each diaphragm pair oscillate inversely with respect to one another. Accordingly, a single drive voltage supply can be used with electrical connections being inverted relative to the first and second diaphragms of a diaphragm pair. Alternatively, multiple voltage supplies could be used as long as drive signals were synchronized to oscillate the first and second diaphragms inversely.

Figure 8:
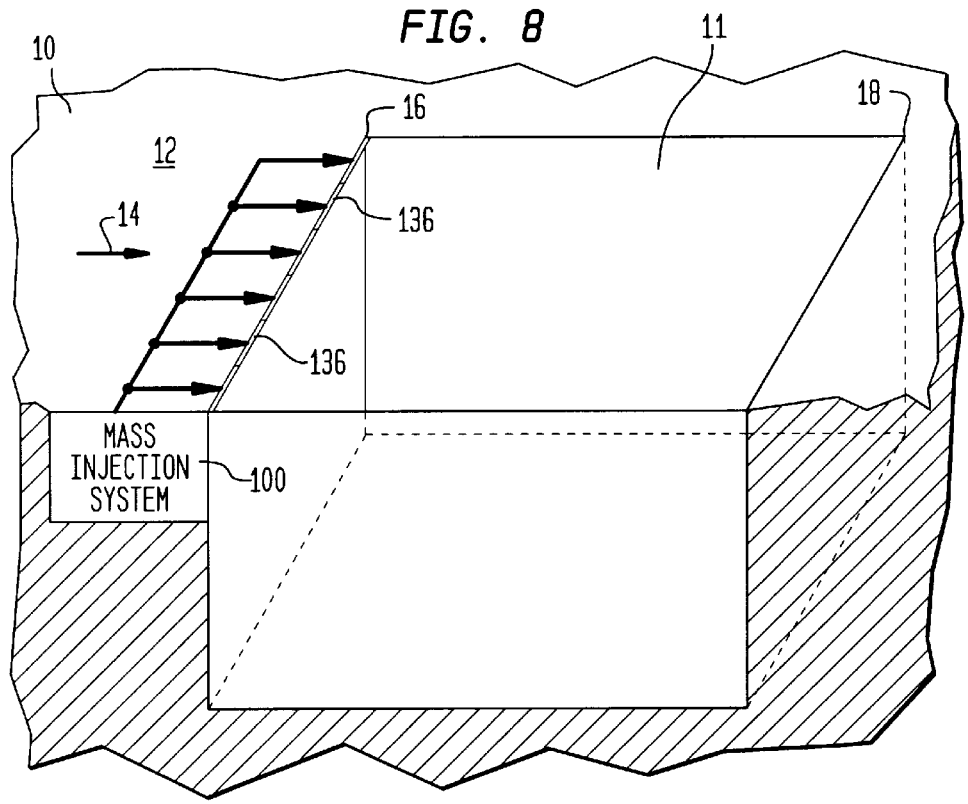
FIG. 8 is a schematic view of an open-loop system incorporating a mass injection system for reducing cavity resonance in accordance with the present invention.

The above-described mass injection systems can be used to reduce flow-induced resonance in a cavity in a fashion similar to that taught in the afore-referenced U.S. patent application Ser. No. 08/751,179, the contents of which are hereby incorporated by reference. In FIG. 8, a schematic view is shown of a cavity 11 in a structure 10 equipped with an open-loop cavity resonance reduction system in accordance with the present invention. The shape and relative size of cavity 11 are for illustrative purposes only as the present invention will work with any shape or size cavity. Flow over structure 10 and cavity 11 is represented by the arrow referenced by numeral 14. The leading and trailing edges of cavity 11 are defined in terms of flow 14. More specifically, leading edge 16 is the first edge of cavity 11 encountered by flow 14 and trailing edge 18 is the last edge of cavity 11 encountered by flow 14.

A thick (usually turbulent) boundary layer of flow 14 separates at leading edge 16. Local conditions such as the shape of leading edge 16 control the actual separation location. The unsteady characteristics of the resulting free shear layer over cavity 11 are determined by the mean profile and turbulence characteristics of incoming flow 14 as well as the disturbances imposed on the shear layer through the receptivity process. The shear layer over cavity 11 develops based on the separating shear layer conditions and the instability characteristics of the mean shear layer profile. Leading edge 16 is the significant location for acoustic receptivity which is defined as the process by which long-wavelength acoustic disturbances couple with the shorter-wavelength disturbances in the separating free shear layer. When leading edge 16 is sharp, the shear layer is highly susceptible to the unsteady pressure gradients imposed by the interaction between the incident acoustic field and leading edge 16. The shear layer over cavity 11 subsequently reattaches to the surface of structure 10 at trailing edge 18.

The present invention provides one or more vent locations 136 (e.g., a plurality are shown in FIG. 8) positioned such that they are flush with surface 12 of structure 10 along leading edge 16. The angle of vent locations 136 with respect to the direction of flow 14 can be modified as needed. Vent locations 136 are coupled to a mass injection system 100 which is constructed in accordance with the teachings detailed above. In the open-loop configuration, each vent location 136 provides pulsed blowing, pulsed suction or oscillating blowing/suction as controlled in accordance with a time-varying function.

Flow disturbances (such as those in the free shear layer formed during separation at the cavity's leading edge 16) draw their energy from the energy in the flow itself. Cavities have natural resonant frequencies at which the largest sound levels occur. The natural resonant frequencies of a cavity are generally a function of the cavity dimensions, and the speed and Mach number of the flow thereover. These frequencies can be determined by measuring sound levels in the cavity using sensors (e.g., microphones, velocity sensors, etc.) placed in the cavity. Generally, there is one dominant frequency of oscillation at which a large fraction of the sound is generated. Since the energy of any flow is finite, the present invention operates to draw energy from the flow so that less energy is available at, for example, the dominant natural resonant frequency of the cavity.

Cavity resonance reduction is achieved by introducing a disturbance into the flow at leading edge 16 of cavity 11. The introduced disturbance extracts energy from the finite energy of the flow thereby making less energy available for the disturbance in the shear layer at, for example, the dominant natural resonant frequency of the cavity. The introduced disturbance should be based on a time-varying function and is typically a periodic function having a fundamental frequency that is different than, for example, the dominant natural resonant frequency. (Note that the present invention could also be practiced by introducing a disturbance in accordance with a periodic function at a natural resonant frequency of the cavity as long as the introduced disturbance was the same magnitude and 180° out-of-phase with respect to the resonant disturbance in the cavity at the selected natural resonant frequency. This approach of noise cancellation is effective only when the signals are "deterministic", i.e., show little random variation in amplitude and phase with respect to time.)

By way of example, all vent locations 136 can vent the same disturbance in unison, i.e., in phase. Thus, the same result could be achieved using a single continuous vent location extending all along leading edge 16. However, while this may be possible for cavities of small width (e.g., less than 2 inches), there are a number of practical benefits to using a plurality of individual vent locations. For example, one large vent location may not be able to provide an even response all along leading edge 16. Also, the use of a plurality of vent locations, each of which can be independently pumped, allows for the application of unique actuation functions (in terms of amplitude, frequency and/or phase) for each vent.

Figure 9:
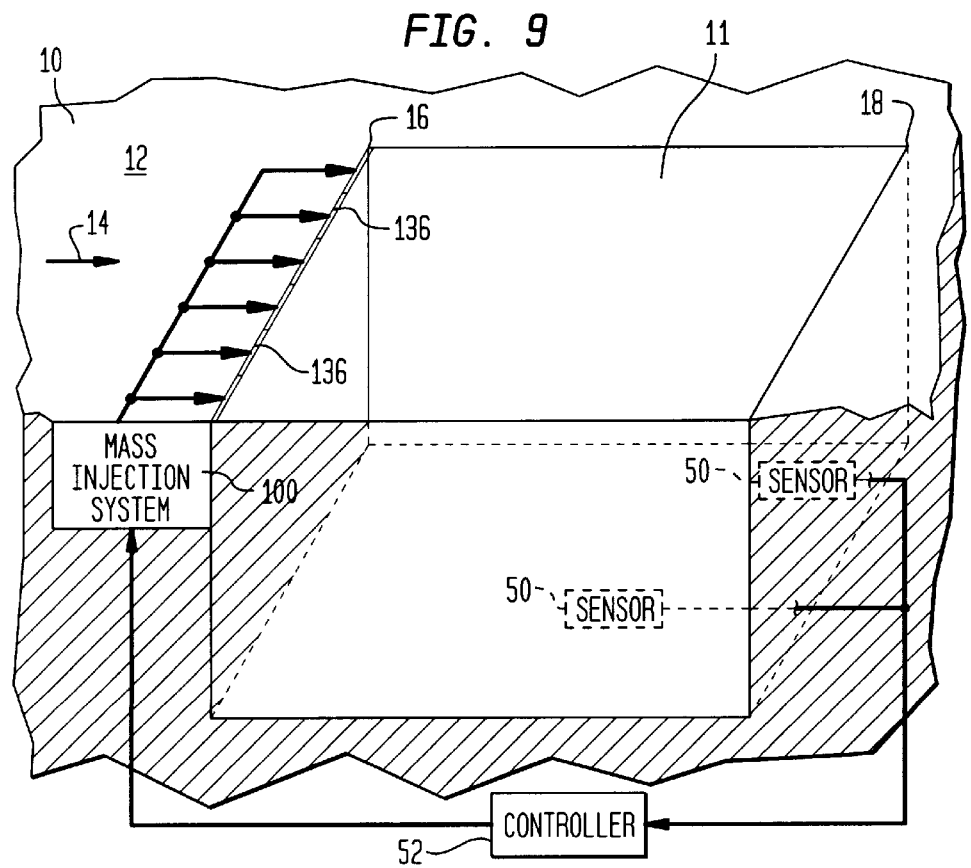
FIG. 9 is a schematic view of a closed-loop system incorporating a mass injection system for reducing cavity resonance in accordance with the present invention.

Open-loop control can be quite effective in reducing cavity noise. However, as with most systems, open-loop control does not necessarily optimize a solution. This is especially true when conditions (e.g., flow conditions) are changing. Accordingly, cavity resonance reduction in the present invention can also be implemented in a closed-loop fashion as will now be explained with reference to FIG. 9 where the open-loop arrangement shown in FIG. 8 is expanded to incorporate sensor(s) and a controller. Identical reference numerals will be used for the elements that are the same as those in FIG. 8.

In the closed-loop configuration, one or more sensors 50 (e.g., microphones, velocity sensors etc.) are placed in cavity 11 in order to measure cavity resonance induced by flow 14. The measured levels from sensors 50 are input to a controller 52 designed to optimize the solution (i.e, output at vent locations 136) for a particular application. For example, the optimal solution might require the achievement of the greatest reduction in sound pressure level at the natural resonant frequency. However, in another application, the optimal solution might require the achievement of overall sound level reduction over the entire frequency spectrum. Accordingly, controller 52 might adjust the pumping solution realized at vent locations 136 in terms of amplitude, frequency and/or phase.

The advantages of the present invention are numerous. By selectively introducing appropriate disturbances in the shear layer of a flow at the leading edge of a cavity, extreme resonant conditions can be reduced. This can be achieved at low energy expenditure by introducing the control input immediately upstream of flow separation, i.e., at the leading edge of the cavity. Control inputs can be derived from acoustic sensors located within the cavity. Cavity noise reduction can be achieved with both open and closed-loop implementations of the present invention.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for reducing flow-induced resonance in a cavity that is formed in a surface of a structure where said cavity has a plurality of resonant frequencies and where a flow moves over said structure and past said cavity such that a leading edge and a trailing edge of said cavity are defined with respect to the direction of said flow, said flow being attached to said surface prior to said leading edge and separating from said surface at said leading edge to generate a shear layer originating at said leading edge, said system comprising:

a housing contained within said structure;

at least one pair of diaphragms mounted in said housing, each pair of diaphragms having a first diaphragm and a second diaphragm separated from one another such that a chamber is formed therebetween within said housing;

an actuator coupled to said at least one pair of diaphragms for oscillating said first diaphragm of said each pair of diaphragms in accordance with a time-varying function and for oscillating said second diaphragm of said each pair of diaphragms inversely to said first diaphragm wherein pressure in said chamber changes in correspondence with said time-varying function; and plumbing coupled to each said chamber and terminating in at least one vent positioned flush with the surface of said structure along said leading edge of said cavity wherein said pressure in said chamber changing in correspondence with said time-varying function introduces a corresponding time-varying disturbance into said shear layer such that energy available in said shear layer interacting with said cavity to generate resonance at at least one of said plurality of resonant frequencies is reduced.

2. A system as in claim 1 further comprising at least one sensor in said cavity for monitoring resonance in said cavity.

3. A system as in claim 2 further comprising a controller coupled between said at least one sensor and said at least one pair of diaphragms for adjusting said time-varying function based on the so-monitored resonance in said cavity.

4. A system as in claim 1 wherein said actuator comprises:

piezoelectric material bonded to at least one surface of said first diaphragm and at least one surface of said second diaphragm; and a voltage supply coupled to said piezoelectric material bonded to at least one surface of said first diaphragm for supplying a drive voltage thereto in accordance with said time-varying function, said voltage supply further coupled to said piezoelectric material bonded to at least one surface of said second diaphragm in such a way that said second diaphragm oscillates simultaneously and inversely relative to said first diaphragm.

5. A system as in claim 4 wherein said piezoelectric material has a direction of polarization and wherein said voltage supply is coupled to each said piezoelectric material to prevent depolarization of each said piezoelectric material.

6. A system as in claim 5 wherein said drive voltage varies in accordance with said time-varying function, and wherein said voltage supply includes a DC bias voltage supply for supplying each said piezoelectric material with a DC bias voltage component.

7. A system as in claim 1 wherein said plumbing comprises:

first and second pathways leading from each said chamber to said surface of said structure;

a first check valve disposed along said first pathway for permitting flow therethrough towards said chamber when said pressure in said chamber is decreasing; and a second check valve disposed along said second pathway for permitting flow therethrough towards said surface of said structure when said pressure in said chamber is increasing.

8. A system as in claim 1 wherein said plumbing comprises:

a first pathway leading from each said chamber to an environment outside of each said chamber;

a second pathway leading from each said chamber to said surface of said structure;

a first check valve disposed along said first pathway for permitting flow therethrough towards said chamber when said pressure in said chamber is decreasing; and a second check valve disposed along said second pathway for permitting flow therethrough towards said surface of said structure when said pressure in said chamber is increasing.

9. A system as in claim 1 wherein at least a portion of each of said first diaphragm and said second diaphragm is simply supported in said housing.

10. A system as in claim 1 wherein at least a portion of each of said first diaphragm and said second diaphragm is clamped relative to said housing.

11. A method of reducing flow-induced resonance in a cavity comprising the steps of:

providing a structure having a cavity formed in a surface thereof, said cavity having a plurality of resonant frequencies;

causing a flow to move over said structure and past said cavity such that a leading edge and a trailing edge of said cavity are defined with respect to the direction of said flow, said flow being attached to said surface prior to said leading edge and separating from said surface at said leading edge to generate a shear layer originating at said leading edge;

providing at least one pair of diaphragms mounted in a housing and separated from one another such that a chamber is formed therebetween within said housing;

oscillating a first diaphragm of said at least one pair of diaphragms in accordance with a time-varying function;

oscillating a second diaphragm of said at least one pair of diaphragms inversely to said first diaphragm wherein pressure in said chamber changes in correspondence with said time-varying function; and venting said chamber at a position flush with said surface of said structure along said leading edge of said cavity wherein said pressure in said chamber changing in correspondence with said time-varying function introduces a corresponding time-varying disturbance into said shear layer such that energy available in said shear layer interacting with said cavity to generate resonance at at least one of said plurality of resonant frequencies is reduced.

12. A method according to claim 11, wherein said time-varying function is a periodic function.

13. A method according to claim 12 wherein said periodic function has a fundamental frequency that is different than a dominant one of said plurality of resonant frequencies of said cavity.

14. A method according to claim 11 further comprising the steps of:

monitoring resonance in said cavity caused by said shear layer; and adjusting said time-varying function based on the so-monitored resonance in said cavity.

15. A method according to claim 14 wherein said step of adjusting includes the step of adjusting the amplitude of said time-varying function.

16. A method according to claim 14 wherein said step of adjusting includes the step of adjusting the frequency of said time-varying function.

17. A method according to claim 14 wherein said step of adjusting includes the step of adjusting the phase of said time-varying function.

* * * * *